June 15, 1971     I. SCHMIDT ET AL     3,585,134
FRAMED FILTER SCREEN AND METHOD OF PRODUCING SAME
Filed Feb. 19, 1969     2 Sheets-Sheet 1
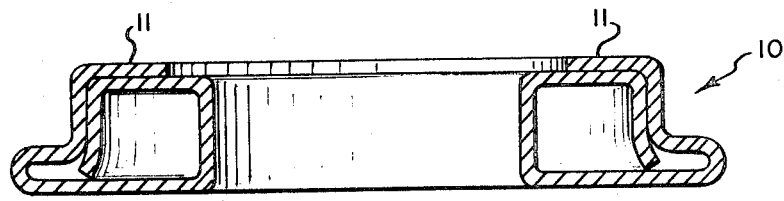
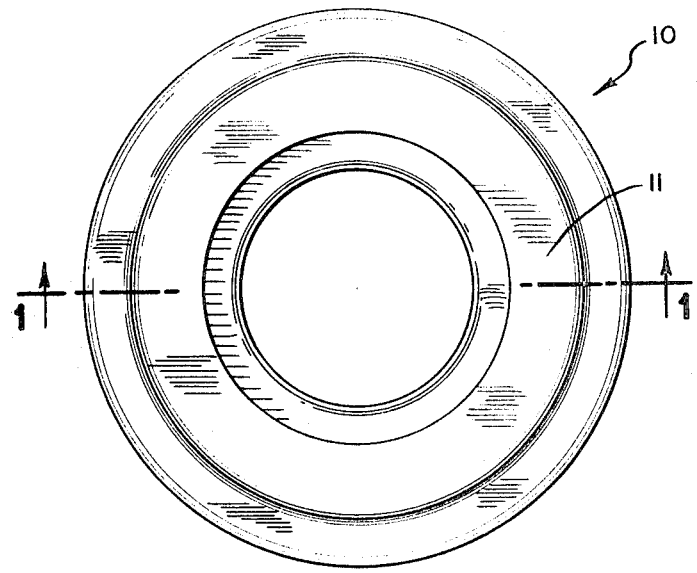
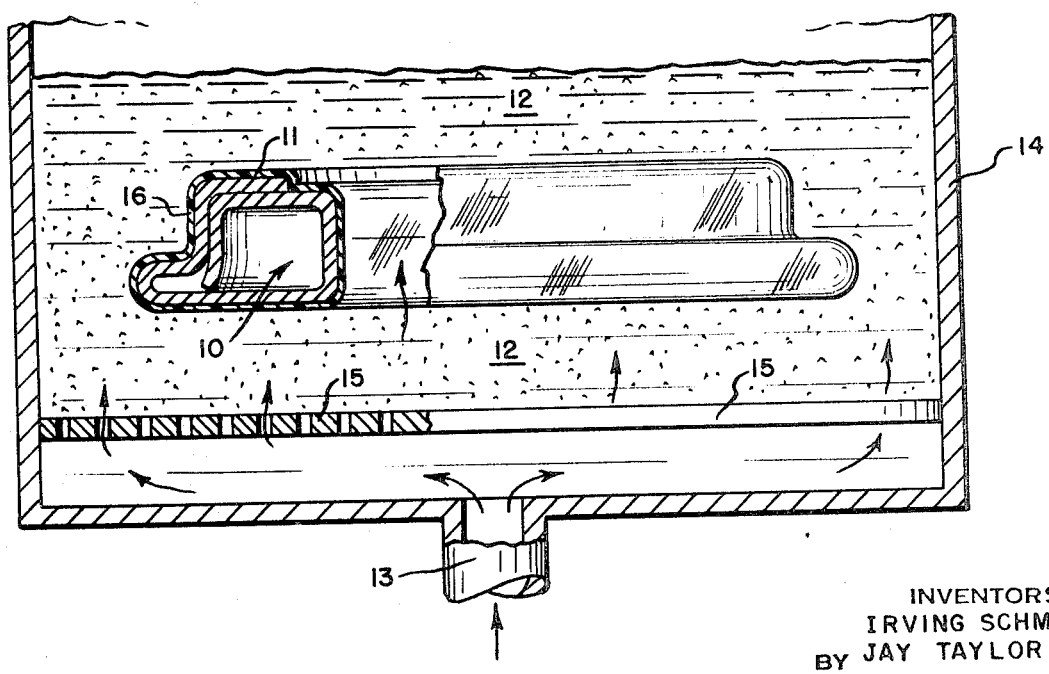
INVENTORS
IRVING SCHMIDT
BY JAY TAYLOR
ATTORNEYS

INVENTORS
IRVING SCHMIDT
BY JAY TAYLOR

United States Patent Office 3,585,134
Patented June 15, 1971

3,585,134
FRAMED FILTER SCREEN AND METHOD OF PRODUCING SAME
Irving Schmidt, Suffern, and Jay F. Taylor, New Rochelle, N.Y., assignors to Multi-Metal Wire Cloth, Inc.
Filed Feb. 19, 1969, Ser. No. 800,382
Int. Cl. B01d 29/04
U.S. Cl. 210—495                                           10 Claims

ABSTRACT OF THE DISCLOSURE

A framed filter screen comprising an endless hollow metal frame and a metal wire mesh screen attached thereto its produced by heating the frame to a temperature which renders its exterior surfaces adherent to particles of a curable epoxy resin, suspending the heated frame in a fluidized bed of such particles to adhere a layer of the particles upon the exterior surfaces of the frame, abutting an endless portion of the layer extending around the entire frame against a metal wire mesh screen while the screen is being maintained flat and taut, and heating the frame-screen assembly to cure the resin particles into a continuous coating which covers the exterior surfaces of the frame and to simultaneously cause the abutted portion of the screen to become permanently embedded in a corresponding endless portion of the cured coating.

---

Figure 4:
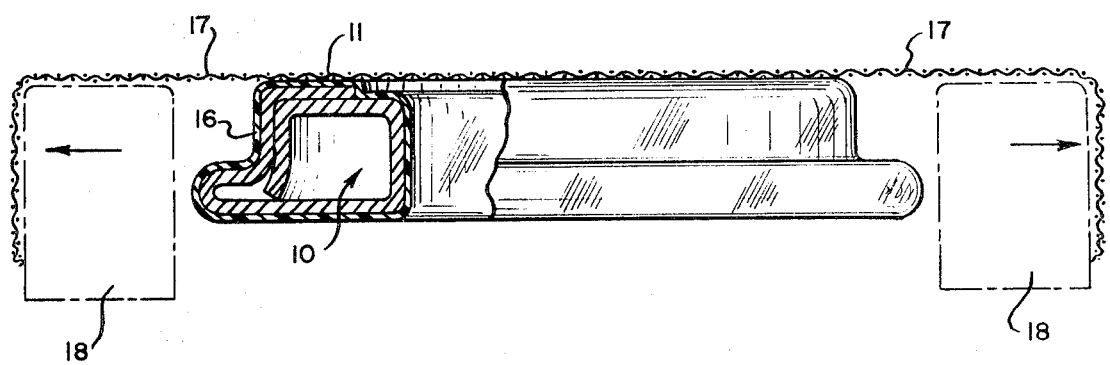

This invention relates to a framed filter screen and to a method of producing the same.

Metal wire mesh screens or cloths are frequently used in filtration or sieve apparatuses to filter or classify solid particles suspended in a gas or liquid. When so used, the screens must be attached to supporting frames in order to maintain the screens, ideally, flat and taut under tension and to provide a means for conveniently mounting the screens in the ultimate apparatus.

Heretofore it has been customary to attach the wire mesh screens to metal frames which mechanically clamp or pinch the screen periphery in order to form a permanent connection with the screen. Such modes of attachment are not entirely satisfactory because they usually require complex frame designs which use a relatively large amount of metal to provide the convolutions and coacting surfaces as well as the strength and rigidity necessary to form secure mechanical connections which will permanently maintain the attached screens flat and taut. Moreover, the junction between the screen and mechanically-attached supporting frame is not gas or fluid-tight and therefore a separate caulking operation may have to be performed where sealing against leakage through this part of the structure is required. Also, if use of the screen will involve exposure to corrosive materials, the supporting frame will then have to be made of stainless steel or similar corrosion-resistant metal, which greatly increases the cost of the unit to both the manufacturer and the customer.

The present invention provides a new form of framed filter screen, and a method of producing the same, which avoids the disadvantages described above. More particularly, a framed filter screen made in accordance with the invention comprises an endless frame of hollow metal having a cured epoxy resin coating which substantially completely covers its exterior surfaces, a metal wire mesh screen extending across the area encompassed by the frame, with a peripheral portion of the screen being permanently imbedded in an endless portion of the coating around the entire frame and with the screen thereby being maintained flat and taut.

The foregoing structure is produced by heating the metal frame to a temperature which renders its exterior surfaces adherent to particles of a curable epoxy resin, adhering a layer of predetermined thickness of the resin particles upon the exterior surfaces, preferably by suspending the heated frame in a fluidized bed of the particles, abutting an endless portion of the layer extending around the entire frame against a metal wire mesh screen while the screen is being maintained flat and taut by a tensioning means, and finally heating the frame-screen assembly to cure the layer of particles into a continuous coating and to simultaneously cause the abutted portion of the screen to sink into the adjacent coalescing resin particles and thereby become permanently embedded in the cured coating.

Accordingly, in the framed filter screen of the invention, a cured epoxy resin coating is used for the dual purposes of permanently attaching the wire mesh screen to a supporting hollow metal frame and of completely covering the exterior surfaces of the frame with a continuous coating. Thus, the complexities of conventional frames based upon mechanical clamping or pinching modes of attachment are eliminated and instead simple rolled hollow metal forms having box beam-like constructions for strength and rigidity can be used as the frames in the products of the invention. Furthermore, since the exterior surfaces of the frame are encapsulated by the cured continuous coating of epoxy resin, corrosive materials cannot reach and corrode the frame and consequently normally corrodable, inexpensive metals such as carbon steel can be safely used to fabricate the frame and at the same time achieve substantial cost savings. In addition, the junction between screen and frame in the products of the invention is automatically sealed against leakage of gas fluids, and a separate step to achieve this is not required.

Figure 5:
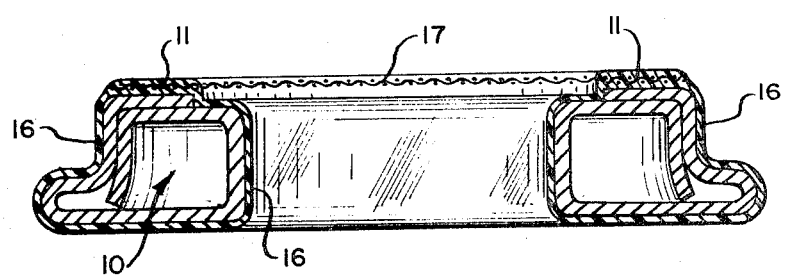

Further advantages and details of the invention will be readily understood by reference to the accompanying drawings which illustrate one product and method embodiment thereof, and of which:

FIG. 1 is a sectional view of an endless hollow metal frame taken along line 1—1 of FIG. 2, FIG. 2 is a top plan view of the frame, FIG. 3 is a side view of the frame suspended in a fluidized bed of epoxy resin particles, FIG. 4 is a sectional view similar to FIG. 1 showing the frame abutted against a tensioned metal wire mesh screen, and FIG. 5 is a sectional view showing the completed framed filter screen.

Referring now to FIGS. 1 and 2, an endless (i.e. circular) metal frame 10 is roll-formed from a circular strip of carbon steel into a hollow structure having a box beam-like cross section for high strength and rigidity. The configuration includes a top flat surface portion 11 extending around the entire frame.

The frame 10 is heated to a temperature of from about 350° to about 450° F. and then suspended (FIG. 3) by a suitable jig (not shown) in a fluidized bed 12 of curable epoxy resin particles maintained in fluidized agitation by a gas under pressure introduced into supply conduit 13 and flowing from manifold 14 up through a porous plate 15 into the resin particles. The frame 10 is held suspended in the fluidized bed until a layer of resin particles from about 0.010 to about 0.020 inch thick has adhered to its exterior surfaces. Then, the frame is removed from the fluidized bed and allowed to cool to ambient temperature.

Referring now to FIG. 4, the frame 10 as a result of the preceding step is completely covered with a layer 16 of curable epoxy resin particles which may be partially fused or coalesced, particularly those which were in actual contact with the heated metal surfaces of the frame. The endless portion of layer 16 adjacent the top flat portion 11 of frame 10 is now abutted against a metal wire mesh screen 17, while the screen is maintained flat and taut under tension. For this purpose, the screen 16 is larger than the maxium area of frame 10 so that the outermost periphery of the screen may be gripped and stretched by a conventional tensioning device 18.

The abutted frame-screen assembly illustrated in FIG. 4 is next heated to a temperature which will cure the layer 16 of epoxy resin particles into a continuous coating. This may be done in an oven or by infrared radiation or any other suitable heating means. Excellent results have been achieved by oven-heating at a temperature of 370° F. for about 15 minutes and then at about 400° to about 450° F. for about 20 to about 45 minutes. During this curing cycle, the resin particles completely fuse and coalesce first into a continuous film which gradually transforms into a hard, insoluble, infusible coating. Simultaneously, the abutted portion of screen 17 sinks into the coalescing particles and becomes permanently embedded in a corresponding endless portion of the cured coating extending around the entire frame.

The final product is illustrated in FIG. 5 with the exterior surfaces of the frame 10 completely covered by the tenaciously-adhered cured epoxy coating 18, with the peripheral portion of screen 17 anchored in the coating to maintain the remainder of the screen, extending across the open area encompassed by the frame, flat and taut, and with the excess portion of the screen previously gripped and stretched by the tensioning device having been cut away. In addition to holding the screen and protecting the metal frame against corrosion, the cured epoxy coating also reinforces and enhances the strength and rigidity of the frame.

The invention has been described in terms of its operative principles and one embodiment thereof. Many variations will be obvious in the illustrated embodiment to those skilled in the art without departing from the spirit and scope of the invention. Accordingly, the scope of the invention is to be determined from the appended claims.

We claim:

1. A framed filter screen comprising an endless frame of hollow metal, a cured epoxy resin coating substantially completely covering the exterior surfaces of said frame, a metal wire mesh screen extending across the area encompassed by said frame, a peripheral portion of said screen being permanently embedded in an endless portion of said coating around said entire frame, said screen being thereby maintained flat and taut.

2. A frame filter screen according to claim 1 wherein said embedded screen portion and said endless coating portion are adjacent a flat surface portion of said frame.

3. A frame filter screen according to claim 1 wherein the endless line of said frame is circular.

4. A framed filter screen according to claim 1 wherein said coating is from about 0.010 to about 0.020 inch thick.

5. A framed filter screen according to claim 1 wherein said frame is made of a metal which in the absence of said coating is readily corroded by materials to which said filter screen is exposed during use in filtering.

6. The method of producing a framed filter screen comprising heating an endless hollow metal frame to a temperature which renders the exterior surfaces thereof adherent to particles of a curable epoxy resin, adhering a layer of predetermined thickness of said particles upon said heated exterior surfaces, abutting an endless portion of said layer extending around said entire frame against a metal wire mesh screen while said screen is being maintained flat and taut, said screen being of a size which extends across the area encompassed by said frame, and heating said frame-screen assembly to cure said layer into a continuous coating which substantially completely covers said exterior surfaces and to simultaneously cause said abutted portion of the screen to become permanently embedded in a corresponding endless portion of said cured coating.

7. The method of producing a framed filter sceen according to claim 6 wherein said frame is heated to a temperature from about 350° to about 450° F. and then suspended in a fluidized bed of of said curable epoxy resin particles to adhere a layer of the particles upon said exterior surfaces.

8. The method of producing a framed filter screen according to claim 7 wherein said frame is cooled to ambient temperature prior to abutting it against said screen.

9. The method of producing a framed filter screen according to claim 6 wherein said screen is of a size larger than the maximum area encompassed by said frame and wherein subsequent to said curing the excess portion of said screen extending outwardly beyond said embedded portion is cut away.

10. The method of producing a framed filter screen according to claim 6 wherein said curing is accomplished by heating said frame-screen assembly at about 375° F. for about 15 minutes and then at about 400° to about 450° F. for about 20 to about 45 minutes.

References Cited

UNITED STATES PATENTS

| | | | |
|---|---|---|---|
| 2,391,215 | 12/1945 | Zabel et al. | 210—495 |
| 2,585,729 | 2/1952 | Berman | 210—495 |
| 3,332,557 | 7/1967 | Pall | 210—495 |

JAMES L. DE CESARE, Primary Examiner